US008981923B2

(12) United States Patent
Kotani

(10) Patent No.: US 8,981,923 B2
(45) Date of Patent: Mar. 17, 2015

(54) REMOTE CONTROL SIGNAL RECEIVER AND ELECTRONIC DEVICE

(75) Inventor: Kazunori Kotani, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 535 days.

(21) Appl. No.: 12/887,678

(22) Filed: Sep. 22, 2010

(65) Prior Publication Data

US 2011/0075053 A1 Mar. 31, 2011

(30) Foreign Application Priority Data

Sep. 25, 2009 (JP) ................................ 2009-221217

(51) Int. Cl.

*H04N 5/44* (2011.01)
*G08C 23/04* (2006.01)
*G08C 17/00* (2006.01)

(52) U.S. Cl.

CPC ................ *G08C 23/04* (2013.01); *G08C 17/00* (2013.01); *G08C 2201/71* (2013.01)
USPC .......................................................... 340/531

(58) Field of Classification Search

CPC ..... G08C 17/00; G08C 23/04; G08C 2201/71
USPC ....................... 340/630, 584, 573.1, 567, 531
See application file for complete search history.

(56) References Cited

U.S. PATENT DOCUMENTS 7,524,069 B2 * 4/2009 Murayama et al. ............. 353/69
2010/0328624 A1 * 12/2010 Chang et al. .................... 353/85

FOREIGN PATENT DOCUMENTS

JP 63-64170 U 4/1988
JP 63-64171 U 4/1988
JP 63-131476 U 8/1988
JP 5-122774 A 5/1993
JP 7-29968 U 6/1995
JP 2000-295678 A 10/2000
JP 2001-298198 A 10/2001
JP 2006-311217 A 11/2006
JP 2008-92023 A 4/2008
JP 2008-286958 A 11/2008
JP 2009021687 1/2009
JP 2009-171179 A 7/2009

OTHER PUBLICATIONS

Japanese Office Action issued on Sep. 6, 2011 in the corresponding Japanese Patent Application No. 2009-221217.

* cited by examiner

*Primary Examiner* — Jennifer Mehmood
*Assistant Examiner* — Yong Hang Jiang
(74) *Attorney, Agent, or Firm* — Novak Druce Connolly Bove + Quigg LLP

(57) ABSTRACT

A remote control signal receiver includes a plurality of signal reception units. Each signal reception unit includes a light reception window arranged in a housing of an electronic device and a light reception element arranged in the housing facing toward the light reception window. The light reception elements of the signal reception units are mounted on a circuit board. A transmission barrier prevents infrared noise entering the housing through the light reception window of one of the signal reception units from being transmitted to the light reception element of another one of the signal reception units.

9 Claims, 7 Drawing Sheets

REMOTE CONTROL SIGNAL RECEIVER AND ELECTRONIC DEVICE

CROSS-REFERENCE TO RELATED APPLICATIONS

This application is based upon and claims the benefit of priority from prior Japanese Patent Application No. 2009-221217, filed on Sep. 25, 2009, the entire contents of which are incorporated herein by reference.

BACKGROUND OF THE INVENTION

The present invention relates to a remote control signal receiver and an electronic device that uses the same, and more particularly, to a remote control signal receiver including a plurality of signal reception units enabling remote control from multiple directions and an electronic device that uses the same.

In the prior art, infrared remote controllers are often used for electronic devices such as video projectors. A remote controller may be combined with more than one signal reception units, or vise versa. For example, Japanese Laid-Open Patent Publication No. 2009-21687 describes an image display device including a plurality of signal reception units for receiving a control code signal transmitted from a remote controller. The image display device includes a signal receiver that may receive control code signals from a plurality of remote controllers with the plurality of signal reception units. In such a case, the operations of the plurality of remote controllers are alternately employed to prevent operations that are unintended by the user from being performed.

SUMMARY OF THE INVENTION

The electronic device may be a video projector, in which case, the needs described below arises. Referring to FIG. 6(*a*), a video projector 1 includes a housing 10 having a front plate 11 and an upper plate 12. A signal reception unit 3 is often arranged on the front plate 11 of the housing 10 to receive an infrared signal 21 from a remote controller 2 when the video projector 1 is placed upright on the floor. However, as shown in FIG. 6(*b*), when the video projector 1 is suspended upside down from the ceiling, it is desirable that the signal reception unit 3 be arranged on the lower surface of the housing 10, which is defined by the upper plate 12, to respond to the infrared signal 21 from the remote controller 2 that is located at a lower position. To satisfy this desire, the signal reception unit 3 may be arranged on the front surface of the housing 10, and a signal reception unit 4 may be arranged on the upper surface of the housing 10, as viewed in a state in which the video projector 1 is placed upright. In this manner, when using a plurality of signal reception units 3 and 4, light reception elements of the signal reception units 3 and 4 may be mounted on the same circuit board to decrease circuit boards and cables and to reduce costs. Further, to harmonize the signal reception units 3 and 4 with the design of the video projector, the signal reception units 3 and 4 may be arranged on a corner of the housing 10 so that the components of the signal reception units 3 and 4 are arranged near one another in the housing 10.

FIGS. 7 and 8 show a referential example of a video projector that receives light signals from multiple directions. FIG. 7 is a perspective view of FIG. 6, and FIG. 8 is a cross-sectional view taken along line A-A in FIG. 7. The referential example of FIGS. 6 to 8 is given by the inventor of the present invention only for comparison with the present invention and is not admitted as prior art. In this example, the front signal reception unit 3 includes a light reception window 31, which is formed in the front plate 11, and a light reception element 32, which is arranged in the housing 10 facing toward the light reception window 31 en a circuit board 5. Further, the upper signal reception unit 4 includes a light reception window 41, which is formed in the upper plate 12, and a light reception element 42, which is arranged in the housing 10 facing toward the light reception window 41 on the circuit board 5.

The signal reception units 3 and 4 are arranged next to each other on the upper right corner of the housing 10. In this specification, the frame of reference is the state of FIG. 7 when referring to the front, rear, left, and right directions. Further, the surface to which the signal reception unit 3 is attached is referred to as the front surface to define the front, rear, left, and right directions. Further, the signal reception units 3 and 4 share the same circuit board 5, on which the light reception elements 32 and 42 and a signal processor for processing signals received from the light reception elements 32 and 42 are mounted. Fastening screws 52 fasten the circuit board 5 to a fastening plate 51 so that the circuit board 5 lies along a plane orthogonal to the front plate 11 and the upper plate 12.

For example, when the video projector 1 is placed upright on the floor as shown in FIG. 6(*a*) and the infrared signal 21 from the remote controller 2 is received by the signal reception unit 3 on the front plate 11, infrared noise 61 from a fluorescent lamp 6, which is arranged on the ceiling, may enter the housing 10 through the light reception window 41 in the upper plate 12. In the same manner, when the video projector is suspended from the ceiling as shown in FIG. 6(*b*) and the infrared signal 21 from the remote controller 2 is received by the lower signal reception unit 4, infrared noise 61 from the fluorescent lamp 6, which is arranged on the ceiling, may enter the housing 10 through the light reception window 31 in the front plate 11.

The infrared light entering the light reception window 41 of the upper plate 12 may be, for example, reflected into stray light by an inner surface of the housing 10 or other electronic components 53 and 54, as shown by the broken lines in FIG. 8. In this case, the stray light may be transmitted to the front signal reception unit 3. The infrared noise 61 received by the light reception element 32 of the signal reception unit 3 may interfere with remote control operations that were intended to be performed in accordance with the infrared signal 21 through the signal reception unit 3. This may result in erroneous operations. The same situation may occur when infrared noise 61 enters the light reception window 31 of the signal reception unit 3.

In this manner, when the signal reception units 3 and 4 are arranged near each other, a continuous space through which a transmission path of the infrared noise 61 extends, that is, a non-partitioned space, is formed in the housing 10 between the signal reception units 3 and 4. As a result, the infrared noise 61 entering the light reception window for one of the signal reception units may affect remote control operations performed by the other one of the signal reception units. However, Japanese Laid-Open Patent Publication No. 2009-21687 does not address this problem. To resolve this problem, a controller that selects the activated one of the signal reception units 3 and 4 may be employed. However, as long as a continuous space, which allows for extension of the infrared transmission path, is formed between the signal reception units 3 and 4 in the housing 10, the infrared noise 61 entering one of the signal reception units (3 or 4) cannot be prevented from interfering with the remote control operations performed by the other one of the signal reception units (4 or 3).

One aspect of the present invention is a remote control signal receiver including a plurality of signal reception units. Each signal reception unit includes a light reception window arranged in a housing of an electronic device and a light reception element arranged in the housing facing toward the light reception window. The light reception elements of the signal reception units are mounted on a circuit board. A transmission barrier prevents infrared noise entering the housing through the light reception window of one of the signal reception units from being transmitted to the light reception element of another one of the signal reception units.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

Figure 1:
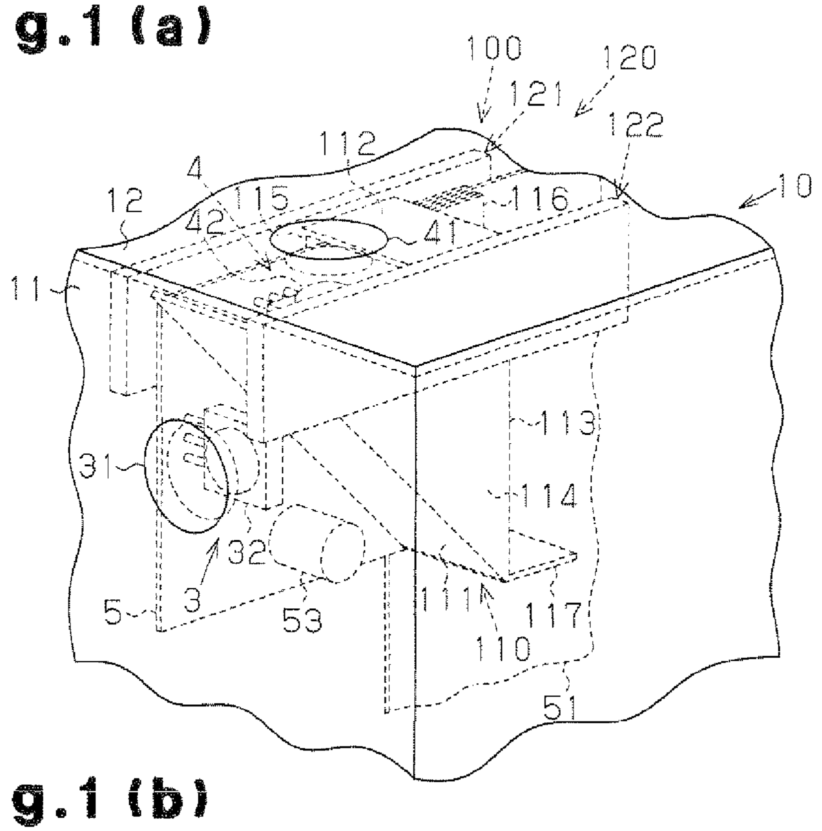
FIG. 1(*a*) is a perspective view showing a remote control signal receiver for a video projector according to one embodiment of the present invention, and FIG. 1(*b*) is a cross-sectional view of FIG. 1(*a*)
Figure 1:
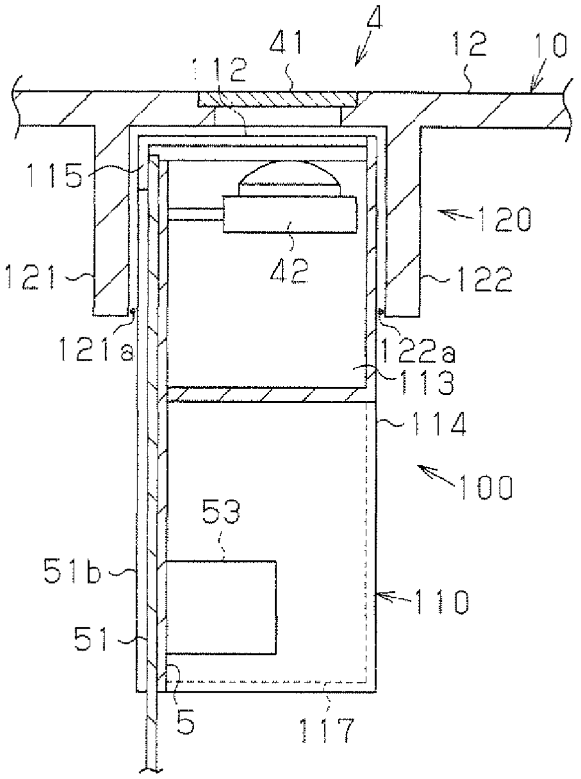

A remote control signal receiver for a video projector according to one embodiment of the present invention will now be discussed with reference to FIGS. 1 to 3. Like or same reference numerals are given to those components that are the same as the corresponding components of the referential example described above. Such components will not be described in detail.

Figure 6A:
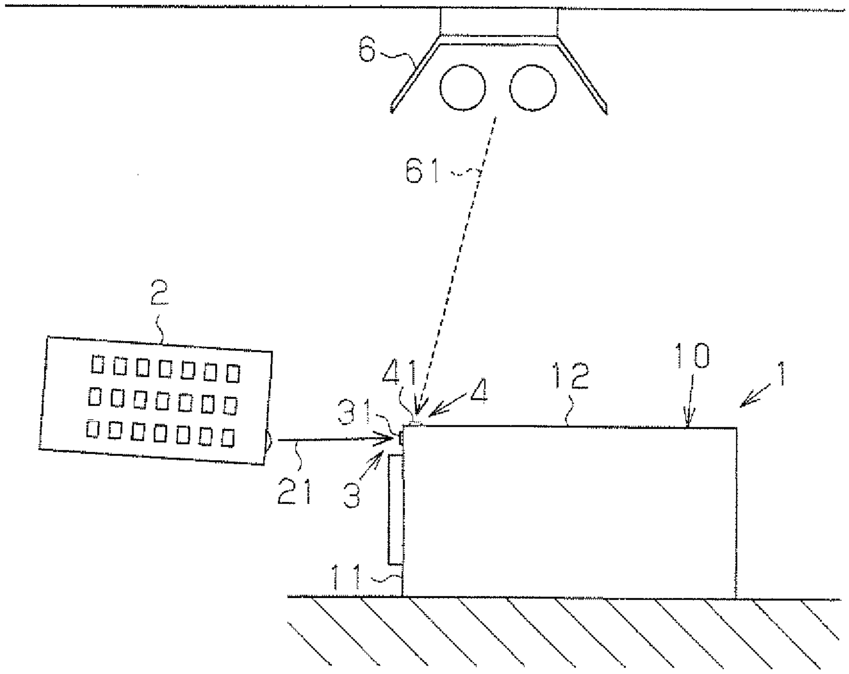
FIG. 6(*a*) is a schematic diagram showing a referential example of a video projector arranged on a floor, and FIG. 6(*b*) is a schematic diagram showing the video project in a state suspended from a ceiling.
Figure 6B:
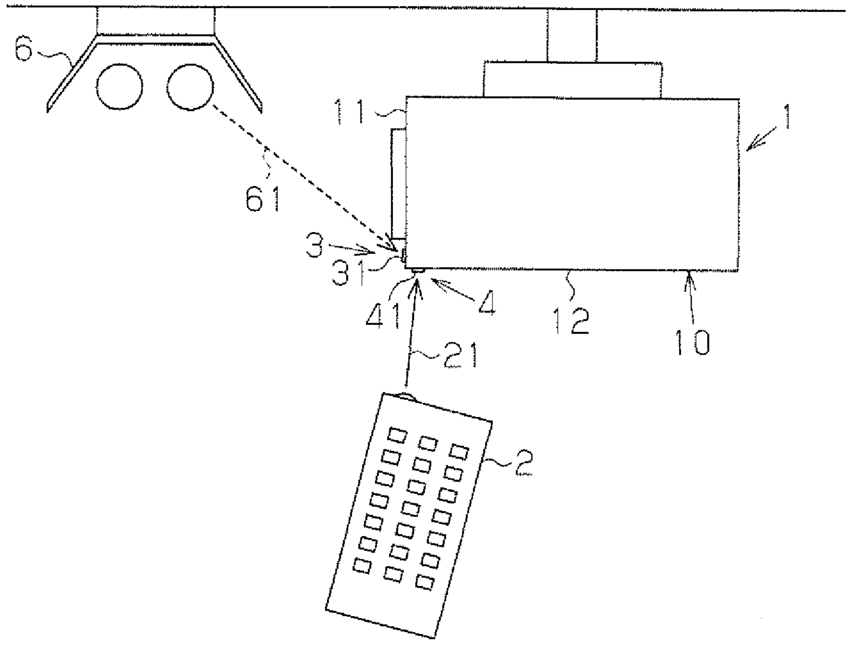
Figure 7:
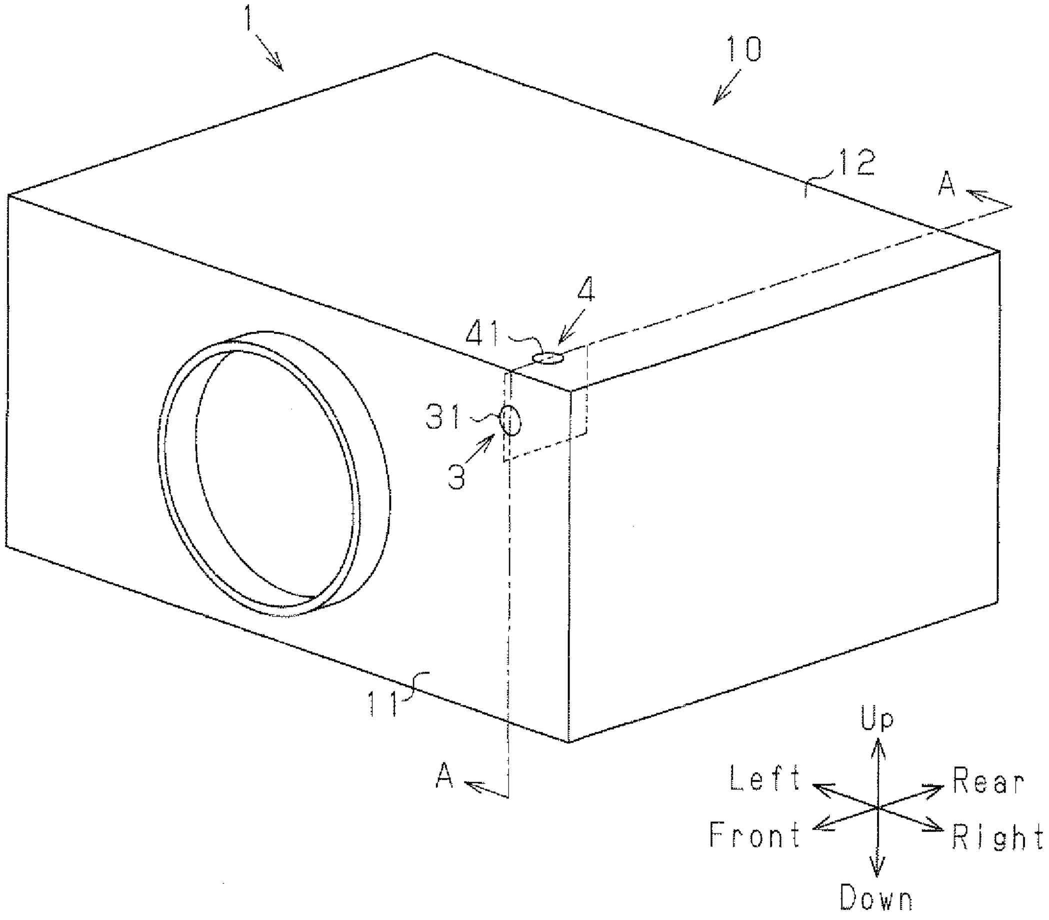
FIG. 7 is a perspective view showing the video projector of FIG. 6.

A video projector 1 serving as an electronic device in this embodiment has an outer appearance that is identical to the video projector of the referential example (refer to FIG. 7). Signal reception units 3 and 4 are arranged on a front plate 11 and an upper plate 12 to allow for the remote controller 2 to perform remote control operations from multiple directions. When comparing the video projector 1 with that of the referential example shown in FIGS. 6 to 8, the arrangement of light reception windows 31 and 41 of the signal reception units 3 and 4 on a housing 10 is the same. Further, the arrangement of the circuit board 5, on which light reception elements 32 and 42 are mounted, on the housing 10 is also the same.

Figure 8:
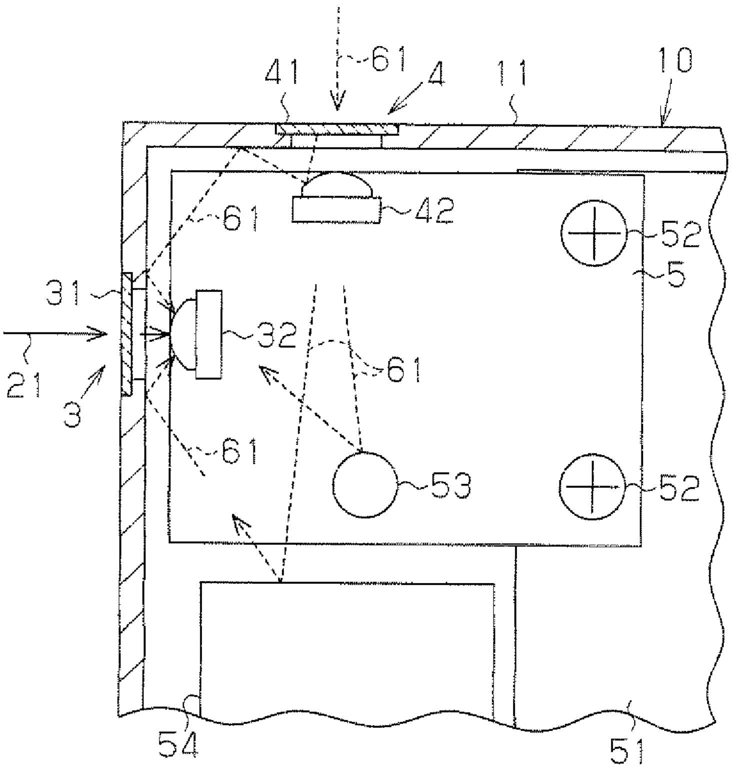
FIG. 8 is a cross-sectional view showing the video projector and taken along line A-A in FIG. 7.

In the video projector 1 of the present invention, a signal receiver includes a transmission barrier 100, which is added to the signal receiver in the referential example of FIGS. 6 to 8. The transmission barrier 100 prevents infrared noise 61 that enters a light reception window (31 or 41) of one of the signal reception units (3 or 4) from being transmitted to light reception elements (42 or 32) of the other one of the signal reception units (4 or 3).

The light reception windows 31 and 41, which are not connected to each other, are each formed by an independent transparent plate. The light reception windows 31 and 41 are each formed to have the minimal required size. Further, the light reception windows 31 and 41 are arranged at different locations on the housing 10. The housing 10 includes a front plate 11 and an upper plate 12. Part of the front plate 11 and part of the upper plate 12 extend between the two light reception windows 31 and 41, as shown in FIGS. 1 and 3. In the illustrated example, the front plate 11 and the upper plate 12 are coupled to each other at a right angle and form a corner in between. The light reception windows 31 and 41 may be located near the line of intersection between the plates 11 and 12. The housing 10 is formed by a non-transparent member from resin or a metal material, such as steel or aluminum.

The transmission barrier 100 (refer to FIG. 1) will now be described in detail.

The transmission barrier 100 cooperates with the circuit board 5 and the housing 10 to spatially separate the light reception elements 32 and 42. A cover member 110 is attached to the circuit board 5 to cover one of the light reception elements. In the illustrated example, the cover member 110, the circuit board 5, and the inner surface of the housing 10 cooperate to define a light reception compartment that encompasses the upper light reception element 42 in the housing 10. The front light reception element 32 that is not covered by the cover member 110 is arranged outside the light reception element compartment.

In a preferred example, the transmission barrier 100 includes a shield 120 that closes gaps between the cover member 110 and the upper plate 12 around the portion of the housing 10 surrounding the light reception window 41. This prevents such gaps from connecting the interior of the cover member 110 that is in communication with the light reception window 41 and the exterior of the cover member 110. That is, the shield 120 prevents the gaps from forming a transmission path of infrared noise 61.

The cover member 110 includes a partition wall 111, an upper wall 112, a rear wall 113, a side wall 114, a hooking wall 115, and a fastening wall 116. The partition wall 111 partitions the two light reception elements 32 and 42 of the signal reception units 3 and 4 on the circuit board 5. The upper wall 112 is arranged next to the upper plate 12 and is open at a portion immediately above the light reception element 42. The rear wall 113 covers the rear surface of the light reception element 42. The side wall 114 faces toward the circuit board 5 and covers the right surface of the light reception element 42. The hocking wall 115 is hooked to the circuit board 5. The fastening wall 116 serves as a fastening piece. In the illustrated example, the cover member 110 resembles a container having a triangular interior. A projection wall 117 serving as a lug extends from the lower rear end of the cover member 110. The partition wall 111 partitions a continuous space between one of the signal reception units and the other one of the signal reception units that would form a transmission path of infrared noise 61. Thus, the partition wall 111 prevents a non-partitioned space from being formed between the signal reception units 3 and 4 in the housing 10. When the light reception elements 32 and 42 are mounted on the same mounting surface of the circuit board 5, it is preferable that the partition wall 111 extend from one edge to another edge of the circuit board 5 on the same mounting surface of the circuit board 5.

The upper wall 112 has a length set so as not to cover the portion immediately above the light reception element 42 and thereby ensure an inlet for an infrared signal 21 between the upper wall 112 and the partition wall 111. It is preferred that the top end of the partition wall 111 be located near the portion of the housing 10 between the light reception windows 31 and 41, particularly, the corner between the front plate 11 and the upper plate 12. The top end of the partition wall 111 is located near the housing 10 to prevent the gap between the top end of the partition wall 111 and the housing 10 from functioning as an infrared noise transmission path. Infrared noise 61 directed toward the gap between the top surface of the partition wall 111 and the housing 10 is repetitively reflected and attenuated by the partition wall 111, the front plate 11, and the upper plate 12. The attenuation occurs when the energy from infrared light striking the partition wall 111, the front plate 11, and the upper plate 12 is partially absorbed by the material forming the partition wall 111, the front plate 11, or the upper plate 12. More specifically, the energy from infrared light striking a dielectric material is partially absorbed by the dielectric material. The infrared light decreases as it repeats reflection. For the same reason, it is preferred that the top end of the circuit board 5 be located near the upper plate 12 and the upper wall 112 of the cover member 110 be located near the upper plate 12.

Figure 2A:
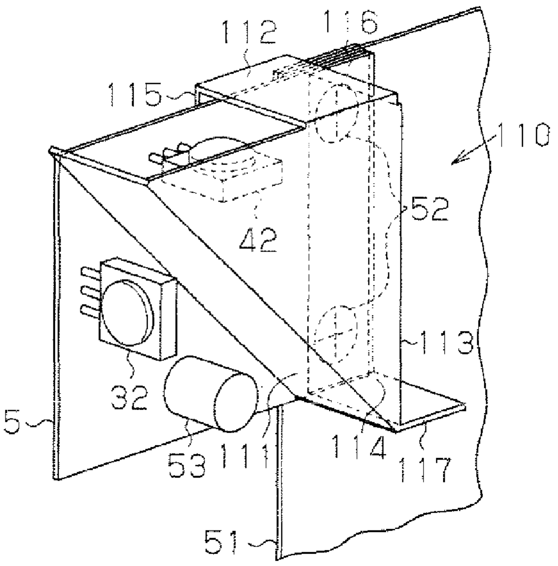
FIG. 2(*a*) is a perspective view showing the remote control signal receiver of FIG. 1(*a*), and FIG. 2(*b*) is an exploded perspective view showing the remote control signal receiver of FIG. 2(*a*)
Figure 2B:
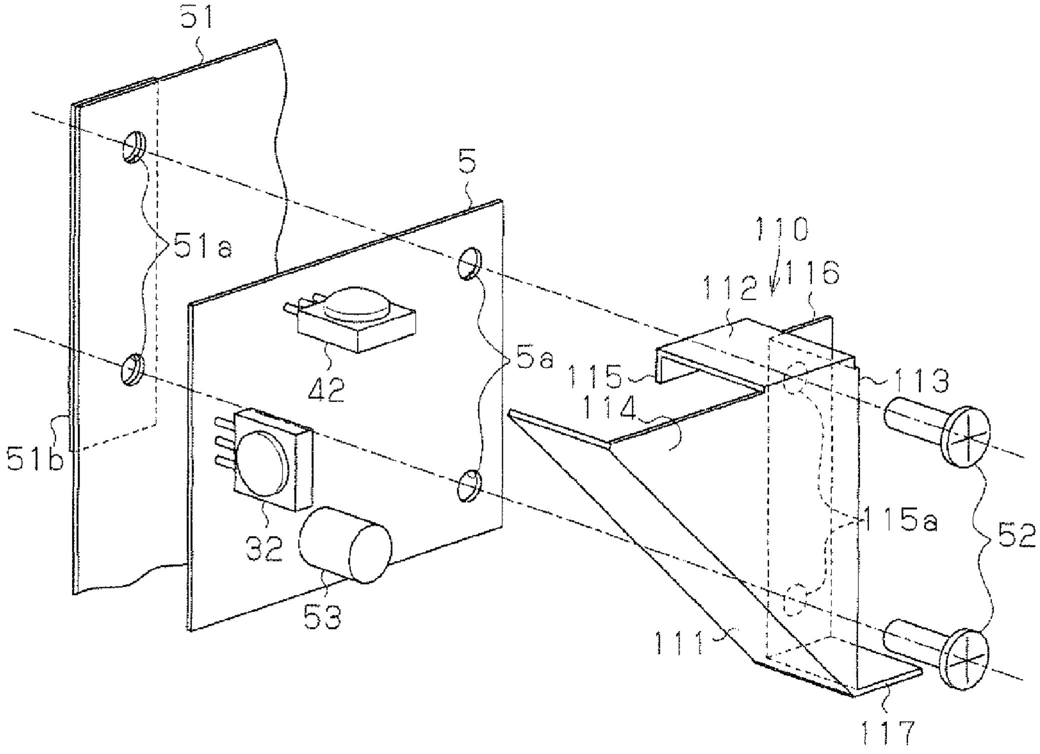

The fastening wall 116 includes two insertion holes 115*a* (refer to FIG. 2(*d*)) into which fastening screws 52 are inserted to fasten the cover member 110 together with the circuit board 5 to a fastening plate 51. A backing plate 51*b* serving as a screw seat is attached to the back surface of the fastening plate 51. The circuit board 5 includes insertion holes 5*a* into which the fastening screws 52 are inserted. Such a structure fastens the cover member 110 together with the circuit board 5 to the fastening plate 51 with the fastening screws 52. The cover member 110 may be formed from a metal material, such as steel or aluminum, or a non-metal material, such as a resin or rubber.

Accordingly, when attaching the cover member 110 to the circuit board 5 so as to cover the light reception element 42, the light reception element 42 is substantially isolated from the other light reception element 32, while ensuring a transmission path for the infrared signal 21 that enters the interior of the cover member 110 through the light reception window 41. In this manner, infrared noise 61 entering one of the two light reception windows 31 and 41 is substantially prevented from being transmitted to the other light reception element 32.

The shield 120 prevents gaps between the cover member 110 and the upper plate 12 from forming a transmission path of infrared noise 61 that connects the interior of the cover member 110, which is in communication with the light reception window 41, and the exterior of the cover member 110. The shield 120 includes downward extending walls 121 and 122, which extend downward from the upper plate 22 and are formed integrally with the upper plate 12. The joined circuit board 5 and cover member 110 are held between the downward extending walls 121 and 122 with slight gaps 121*a* and 122*a* formed in between. The slight gaps 121*a* and 122*a* between the circuit board 5 and the cover member 110 repetitively reflects and attenuates the infrared noise 61 passing through the gaps 121*a* and 122*a*. In this manner, the downward extending walls 121 and 122 substantially prevent leakage of the infrared noise 61 while leaving a gap between the top end of the cover member 110 and the upper plate 12.

It is preferred that the downward extending walls 121 and 122 be in contact with the circuit board 5 and the cover member 110 so as not to form the gaps 121*a* and 122*a*. However, when it is difficult to completely eliminate the gaps 121*a* and 122*a* for economic or manufacturing reasons, the shield 120 shown in FIG. 1(*b*) is effective.

The remote control signal receiver of the present embodiment and the video projector using the remote control signal receiver prevent the infrared noise 61 entering the light reception window (31 or 41) of one of the signal reception units (3 or 4) from being transmitted to the light reception element (42 or 32) of the other one of the signal reception units (4 or 3) as described below.

For example, FIG. 6*a*) shows a situation in which infrared noise 61 enters the upper light reception window 41. In this case, as shown in FIG. 3, the entering infrared noise 61 is repetitively reflected in the interior of the cover member 110 and ultimately transmitted to the gap between the cover member 110 and the upper plate 12. However, as shown in FIG. 1(*b*), the gap between the upper plate 12 and the joined circuit board 5 and cover member 110 is small, and the infrared noise 61 is repetitively reflected and attenuated when passing through the gap. The infrared noise 61 transmitted out of the cover member 110 from the gap is further repetitively reflected and attenuated in the gap 121*a* between the circuit board 5 and the downward extending wall 121 of the shield 120 or in the gap 122*a* between the side wall 114 and the downward extending wall 122 of the shield 120. In this manner, the infrared noise 61 is prevented from being transmitted out of the gaps 121*a* and 122*a*.

In the front part of the joined circuit board 5 and cover member 110, the top end of the partition wall 111 is located near the corner between the upper plate 12 and the front plate 11. The infrared noise 61 directed toward the gap between the top end of the partition wall 111 and the corner is repetitively reflected by the partition wall 111, the front plate 11, and the upper plate 12. This prevents transmission of the infrared noise 61 from the gap. Further, in the rear part of the joined circuit board 5 and cover member 110, a small gap is formed between the upper wall 112 and the upper plate 12. Thus, in the same manner as the front part, transmission of the infrared noise 61 is prevented.

The above describes a situation in which infrared noise 61 enters the light reception window 41 when performing a remote control operation with the front signal reception unit 3. The same situation occurs when, for example, as shown in FIG. 6(*b*), infrared noise 61 enters the light reception window 31 and remote control operation is performed with the upper signal reception unit 4. More specifically, in the front part of the joined circuit board 5 and cover member 110, the top end of the partition wall 111 is located near the upper plate 12. Thus, the infrared noise 61 directed toward the gap between the top end of the partition wall 111 and the upper plate 12 and enters the interior of the cover member 110 is repetitively reflected between the partition wall 111 and the housing 10. This prevents transmission of the infrared noise 61 from the gap to the interior of the cover member 110. Further, in the rear part of the joined circuit board 5 and cover member 110, the gap is small between the upper wall 112 and the upper plate 12. Thus, the infrared noise 61 in the gap directed toward the interior of the cover member 110 is repetitively reflected and attenuated in the gap. This prevents the infrared noise 61 from being transmitted to the interior of the cover member 110.

The infrared noise 61 that enters the interior of the cover member 110 through the gap 121*a* between the circuit board 5 and the downward extending wall 121, the gap 122*a* between the side wall 114 and the downward extending wall 122, and the gap between the cover member 110 and the upper plate 12 is repetitively reflected and attenuated in the gap 121*a*, the gap 122*a*, and the gap between the cover member 110 and upper plate 12. Accordingly, the infrared nose 61 is prevented from entering the interior of the cover member 110.

In this manner, in the remote control signal receiver the present embodiment, the infrared noise 61 entering the light reception window (31 or 41) of one of the signal reception units (3 or 4) is prevented from being transferred to the light reception element (42 or 32) of the other one of the signal reception units (4 or 3). This prevents remote control operations performed by the other one of the signal reception units (4 or 3) from being interfered.

The remote control signal receiver of the present embodiment has the advantages described below.

(1) The transmission barrier 100 prevents the infrared noise 61 entering the light reception window (31 or 41) of one of the signal reception units (3 or 4) from being transferred to the other one of the signal reception units (4 or 3). Thus, intended remote control operations performed in accordance with the infrared signal 21 with the other one of the signal reception units (4 or 3) are not interfered by the infrared noise 61.

(2) If the light reception windows 31 and 41 were to be connected to each other and the infrared noise 61 were to be emitted toward either one of the light reception windows 31 and 41, there would be a tendency for the infrared noise 61 to be transmitted to the light reception elements 32 and 42 of the other one of the signal reception units 3 and 4. However, in the illustrated example, the light reception windows 31 and 41 are not connected to each other and formed independently from each other in the housing 10. Thus, such a problem does not occur.

(3) The transmission barrier 100 is formed to cooperate with the housing 10 and prevent the transmission of infrared noise 61 from one of the signal reception units to the other one of the signal reception units. By using part of the originally existing housing 10 of the electronic device, the structure of the transmission barrier 100 is simplified.

(4) The transmission barrier 100 is formed to cooperate with the circuit board 5 and prevent transmission of infrared noise 61 from one of the signal reception units to the other one of the signal reception units. The transmission barrier 100 isolates the light reception elements 32 and 42, which are mounted on the circuit board 5, from each other. Thus, the use of at least part of the circuit board 5 simplifies the structure of the transmission barrier 100.

(5) The transmission barrier 100 includes the partition wall 111, which partitions the signal reception units 3 and 4 on the circuit board 5. As shown in FIG. 3, the partition wall 111 prevents the infrared noise 61 from being directly transmitted from one of the signal reception units to the light reception element of the other one of the signal reception units. This significantly contributes to preventing the transmission of the infrared noise 61. It should be noted that even if the transmission barrier 100 were to include just the partition wall 111, this would still have a significant effect for preventing infrared noise transmission.

Figure 3:
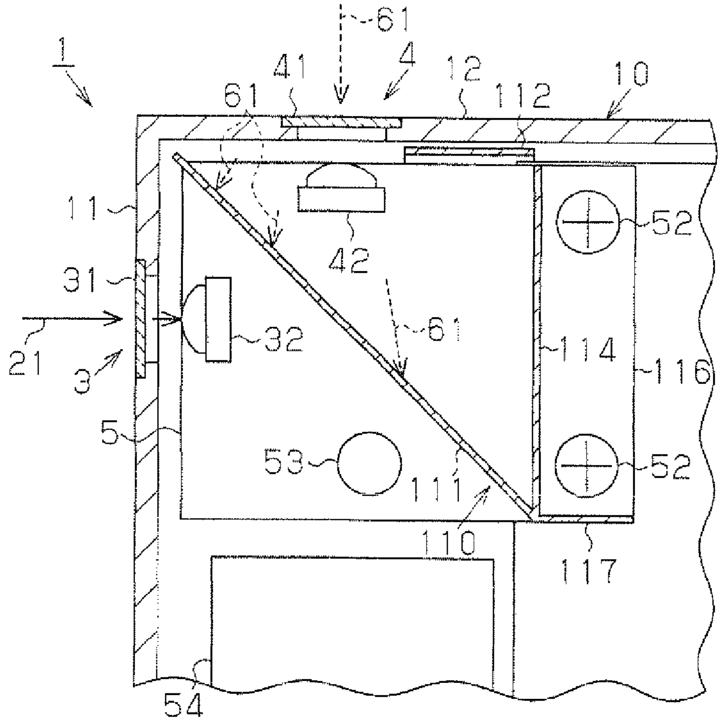
FIG. 3 is a diagram showing a transmission barrier in the remote control signal receiver of FIG. 1(*a*)

(6) As apparent from FIG. 3, one end of the partition wall 111 is located near the housing 10 between the light reception windows 31 and 41, specifically, the corner between the front plate 11 and the upper plate 12. Thus, the partition wall 111 cooperates with the housing to encompass the portion through which infrared noise 61 has a tendency to pass near the signal reception units 3 and 4. This effectively prevents the transmission of infrared noise 61 with a simplified structure. Further, the infrared noise 61 that passes through the gap between the partition wall 111 and the housing 10 is repetitively reflected and attenuated by the partition wall 111 and the housing 10. This prevents transmission of the infrared noise 61.

(7) The cover member 110 of the transmission barrier 100 is attached to the circuit board 5 so as to cover the light reception element 42 while leaving a transmission path for the infrared signal 21 into the interior of the cover member 110 from the light reception window 41. The light reception element 32 located outside the cover member 110 is substantially shut out from the interior of the cover member 110. This substantially prevents the transmission of infrared noise 61 between the interior and exterior of the cover member 110.

(8) The shield 120 of the transmission barrier 100 prevents the interior of the cover member 110 that is communication with the light reception window 41 and the gap between the cover member 110 and the exterior from forming a transmission path for infrared noise 61. More specifically, the shield 120 includes the downward extending wall 121, which faces toward the circuit board 5 with the slight gap 121*a* in between, and the downward extending wall 122, which faces toward the side wall 114 with a slight gap 122*a* in between. Accordingly, infrared noise 61 passing through the gap between the cover member 110 and the housing 10 is repetitively reflected and attenuated by the shield 120. This effectively prevents transmission of the infrared noise 61.

Even when a gap connecting the exterior and interior of the cover member 110 is located near the light reception window 41, the shield 120 encompasses the light reception element 42 outside the cover member 110. This substantially prevents transmission of infrared light from the light reception window 41 to the exterior of the cover member 110.

(9) In the front part of the joined circuit board 5 and cover member 110, the top end of the partition wall 111 is located near the corner between the upper plate 12 and the front plate 11. Thus, infrared noise 61 passing through the gap between the top end of the partition wall 111 and the housing 10 is repetitively reflected and attenuated. This prevents transmission of the infrared noise 61. Further, in the rear part of the joined circuit board 5 and the cover member 110, a small gap is formed between the upper wall 112 and the upper plate 12. Thus, in the same manner as in the front part, infrared noise 61 is repetitively reflected and attenuated. This prevents transmission of the infrared noise 61.

(10) The electronic device of the present embodiment includes the above-described remote control signal receiver. Thus, remote control operations may be performed from multiple directions without any problems.

(11) The video projector serving as an electronic device according to one embodiment of the present invention includes the above-described remote control signal receiver. This facilitates and ensures remote control operations in various states of installation, such as when the video projector is placed on a floor, hooked on a wall, or suspended from a ceiling.

It should be apparent to those skilled in the art that the present invention may be embodied in many other specific forms without departing from the scope of the invention. Particularly, it should be understood that the present invention may be embodied in the following forms.

The transmission barrier 100 may be formed by only the partition wall 111. Such a structure would also be significantly advantageous as mentioned in the foregoing description.

In the above-discussed embodiment, the top end of the partition wall 111 is located near the corner of the front plate 11 and the upper plate 12. However, when allowed by assembly conditions, the top end of the partition wall 111 may be in contact with the corner of the front plate 11 and the upper plate 12. This would prevent the transmission of infrared noise more easily.

The transmission barrier 100 may be formed by just the cover member 110, and the shield 120 may be eliminated. In such a structure, one of the signal reception units would be substantially covered. This would substantially prevent transmission of the infrared noise 61.

In the above-discussed embodiment, the cover member 110 covers the light reception element 42 of the upper signal reception unit 4, and the shield 120 corresponds to the light reception window 41 of the signal reception unit 4. Instead, the cover member 110 may cover the light reception element 32 of the front signal reception unit 3, and the shield 120 may be formed in correspondence with the light reception window 31 of the signal reception unit 3. This would obtain the same advantages as in the above-discussed embodiment.

Figure 4:
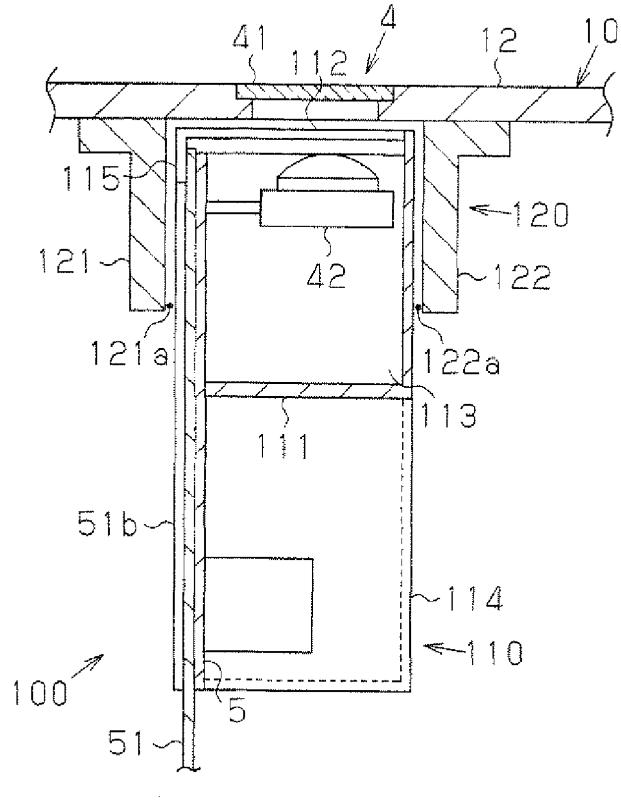
FIG. 4 is a cross-sectional view showing a modification of the remote control signal receiver.

The downward extending walls 121 and 122 are formed integrally with the upper plate 12 in the above-discussed embodiment. Alternatively, as shown in FIG. 4, downward extending walls 121 and 122, which are discrete from the upper plate 12, may be fixed to the upper plate 12 by a suitable means, such as adhering or welding. When the downward extending walls 121 and 122 are discrete from the upper plate 12, a slight gap may be formed between the downward extending walls 121 and 122 and the upper plate 12. Such a gap may result in a lower effect for shielding infrared noise compared to the above-discussed embodiment.

Figure 5:
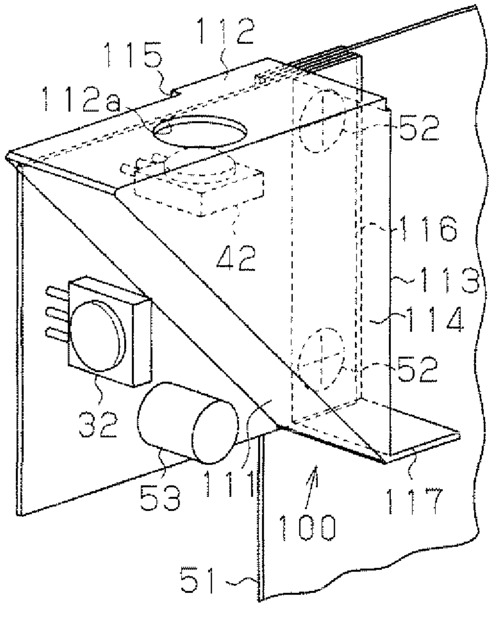
FIG. 5 is a cross-sectional view showing a further modification of the remote control signal receiver.

In the above-discussed embodiment, the upper wall 112 is formed so as to ensure an inlet for an infrared signal 21 between the upper wall 112 and the partition wall 111. The shape of the upper wail 112 is not limited as long as it does not cover the portion located immediately above the light reception element 42. For example, as shown in FIG. 5, the upper wall 112 may be connected to the top end of the partition wall 111 and include a hole 112*a*, which allows for the passage of the infrared signal 21.

The present examples and embodiments are to be considered as illustrative and not restrictive, and the invention is not to be limited to the details given herein, but may be modified within the scope and equivalence of the appended claims.

What is claimed is:

1. A remote signal control signal receiver comprising:

a housing having a first surface and a second surface adjacent to the first surface;

a circuit board having a first surface and a second surface opposite and parallel to the first surface of the circuit board, with the circuit board mounted within the housing;

a first signal reception unit with a first light reception element mounted on the first surface of the circuit board;

a second signal reception unit with a second light reception element mounted on the first surface of the circuit board;

and a cover member mounted on the first surface of the circuit board and substantially enclosing the second light reception element; wherein, the first surface of the housing includes a first light reception window with the first light reception element positioned within the housing facing the first light reception window;

wherein, the second surface of the housing includes a second light reception window with the second light reception element positioned within the housing facing the second light reception window; and wherein, the cover member includes an opening positioned at the second light reception window.

2. The remote control signal receiver according to claim 1, wherein the light reception windows of the signal reception units are formed independently from each other in the housing without being connected to each other.

3. The remote control signal receiver according to claim 1, wherein the cover member is formed to cooperate with the housing and substantially prevent the transmission of infrared noise from the one of the signal reception units to the another one of the signal reception units.

4. The remote control signal receiver according to claim 1, wherein the cover member is formed to cooperate with the circuit board and substantially prevent the transmission of infrared noise from the one of the signal reception units to the another one of the signal reception units.

5. The remote control signal receiver according to claim 1, wherein the signal reception units are arranged in the housing concentrated at a corner at which at least two surfaces of the housing intersect each other.

6. An electronic device comprising the remote control signal receiver according to claim 1.

7. The electronic device according to claim 6, wherein the electronic device is a video projector.

8. The remote control signal receiver of claim 1, wherein the first housing surface is substantially perpendicular to the second housing surface.

9. The remote control signal receiver of claim 1 further comprising:

a shield;

wherein the shield is positioned between the cover member and the housing around the cover member opening and the second light reception window and further seals the interior of the cover member from the exterior of the cover member within the interior of the housing.

* * * * *